Oct. 28, 1941.    H. E. MUSSELMAN    2,260,635
HEAD AND TABLE ADJUSTING MECHANISM FOR DRILL PRESSES AND THE LIKE
Filed March 26, 1941
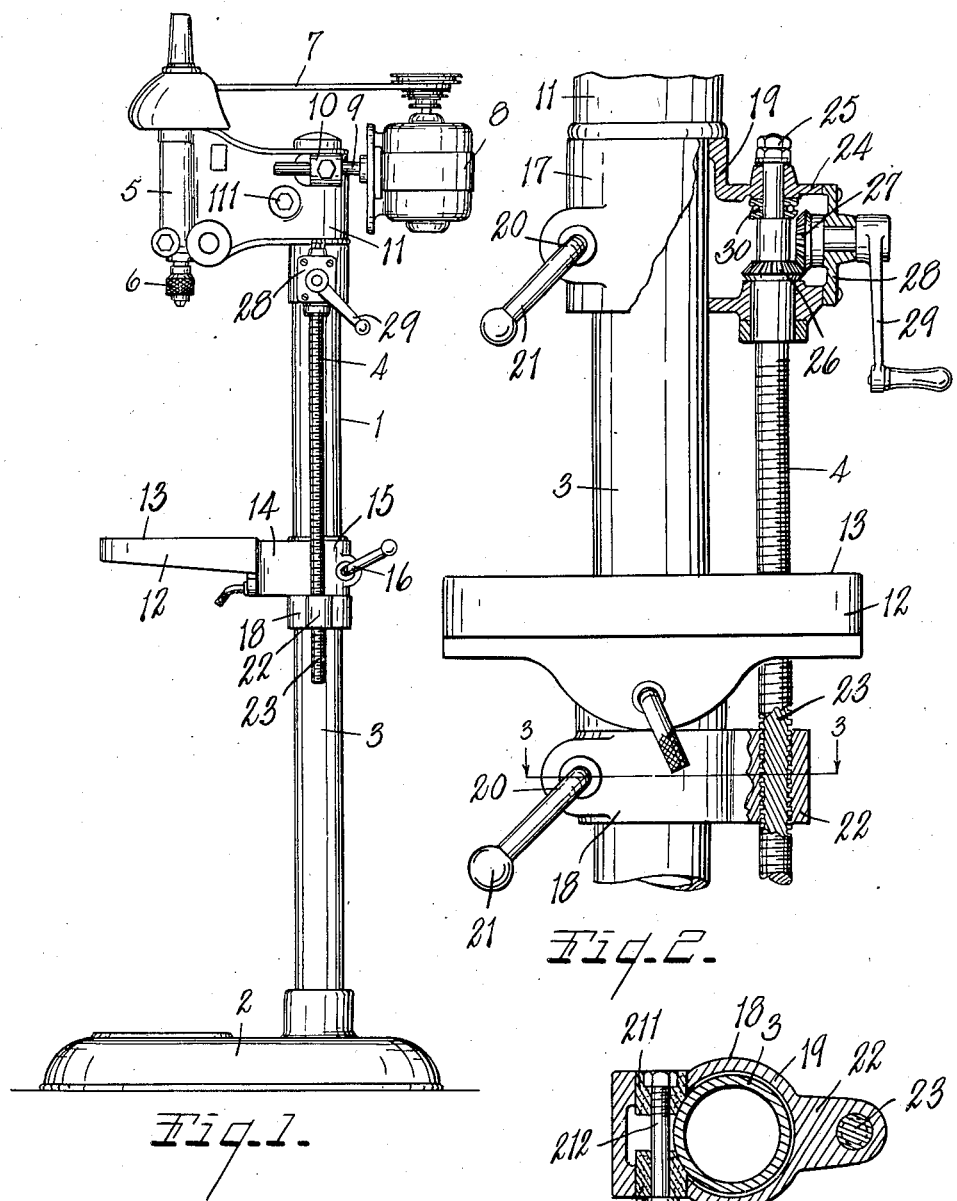
INVENTOR.
Henry E. Musselman
BY Earl + Chappell
ATTORNEYS.

Patented Oct. 28, 1941

2,260,635

UNITED STATES PATENT OFFICE 2,260,635

HEAD AND TABLE ADJUSTING MECHANISM FOR DRILL PRESSES AND THE LIKE

Henry E. Musselman, Kalamazoo, Mich., assignor to Atlas Press Company, Kalamazoo, Mich.

Application March 26, 1941, Serial No. 385,251

12 Claims. (Cl. 77—20)

This invention relates to improvements in head and table adjusting mechanisms for drill presses and the like.

The main objects of this invention are:

First, to provide a drill press or similar machine tool having a press head and work supporting table which are mutually adjustable vertically, whereby to position the same relative to one another and at varying elevations as desired.

Second, to provide a press or similar machine tool of the foregoing character including readily manipulable means for quickly and easily adjusting the tool bearing head and work supporting table thereof relative to one another to enable varying types of work to be supported and operated on with maximum convenience.

Third, to provide a head and table assembly for presses and the like of the type described in which the provisions for manipulation and positioning of the head and table are exceedingly simple and the operation thereof readily understood by unskilled persons.

Fourth, to provide a head and table assembly for a drill press or equivalent mechanism, which assembly is simple, compact, and readily installed on existing press structures and which is readily actuable to position the head and table relative to one another as desired.

Further objects relating to details and economies of my invention will appear from the description to follow. The invention is defined in the claims.

A structure embodying the features of my invention is illustrated in the accompanying drawing, wherein:

Fig. 1 is a view in side elevation illustrating a drill press embodying the improved head and table adjusting assembly of my invention.

Fig. 2 is an enlarged fragmentary view in front elevation partially broken away and in vertical section to more clearly illustrate certain of the details of construction of the assembly.

Fig. 3 is a fragmentary view in section on line 3—3 of Fig. 2, illustrating details of the table clamping device constituting a part of the assembly.

This invention relates to a simple, inexpensive, and highly practical arrangement for vertically positioning the operating head and work supporting table of a drill press or similar machine tool relative to one another. Though in the specification to follow I make specific reference to a rotatable drill press, it will be readily perceived by those skilled in the art that the principles of my invention are applicable to other types of machine or other tools whether of a vertical nature, as is generally the case in a drill press, or otherwise. The aforesaid provisions, briefly stated, enable the table or work support and tool carrying head to be adjustably positioned as desired, either in their relation to one another or in their elevation or spacing relative to the floor or other supporting base or surface, and the actuating instrumentalities for effecting said adjustments are exceedingly simple of manipulation.

Referring to the drawing, the reference numeral 1 in general indicates a drill press, the operation of which is entirely conventional, save for the adjusting features of my invention to be described.

This press has an enlarged base 2 providing a stable support for the vertically extending column 3 on which the press head and work supporting assembly of my invention, illustrated in Fig. 2 and generally indicated by the reference numeral 4, are slidably and adjustably supported. The press has a head casting 5 which is generally of a well known conventional form adapted to rotatably support the tool spindle and chuck 6, the latter being rotated by means of a belt power transmission 7 from a motor 8 provided with a supporting base and legs 9 which are adjustably positionable in a boss 10 on the head to thereby enable the tension of the belt transmission 7 to be regulated. The head 5 includes an integral axially elongated collar or sleeve 11 slidable vertically and swingable on the column 3, and a column lock 111 also provided to clamp the head in any desired position on the column.

The table 12 includes a tiltable work supporting portion 13 adapted to be alined vertically with the chuck 6 and a column engaging portion 14 on which portion 13 is adjustably carried, portion 14 being provided with a sleeve 15 slidable vertically on column 3, which sleeve may be split and provided with suitable clamping means 16 of conventional character for securing the table in any desired position. It will be understood as the description proceeds that the head column lock 111 and table clamp 16 will be selectively loosed to free the head and table from the column in the alternate selective adjustments thereof contemplated by the invention.

The head 5 and table 12 are adjustably positionable vertically on column 3 relative to the base 2 or to one another by means of the adjusting assembly 4, which constitutes the subject matter of the invention and will now be described in detail.

Referring to Fig. 2, the assembly comprises upper and lower hollow sleeve-like castings 17, 18 respectively, each provided with a hollow axial portion or collar 19 slidably engageable with the column. These collars are provided with identical column clamping or locking means illustrated in Fig. 3 and indicated in general by the reference numeral 20, manipulable by a handle 21 to enable the collars 17, 18 to be selectively clamped on the column in any vertically adjusted position thereof, either relative to base 2 or one another. The lock 20, for example, may comprise coacting spaced wedge members 211, one of which has threaded engagement with an actuating rod 212 on the handle 21 so as to wedgingly engage and disengage the column as the handle is actuated.

The collar 19 of the upper supporting member 17 is disposed beneath the head sleeve 11 to support the same. The other collar 18 is disposed in table supporting position beneath the table supporting sleeve 14, but is otherwise unconnected thereto to enable angular swinging of the table if such is desired.

Referring to Fig. 2, table supporting member 18 has a laterally extending boss 22 which is interiorly threaded to receive the elongated threaded actuating or screw rod 23. This latter is rotatably received in a hollow extension or housing 24 on the upper supporting member 17, having lock unts 25 disposed externally of the housing to receive downward thrust and restrain the rod in that direction. Secured to rod 23 internally of the housing 24 is a bevel gear 26 and meshingly engaging this bevel gear, I provide a further actuating bevel gear 27 which is rotatably mounted in a closure plate 28 for the housing. Gear 28 is actuated by means of a suitable crank 29.

An end thrust bearing 30 is preferably provided to surround a reduced portion of the screw rod 23 in the housing 24 so as to receive upward thrust exerted by the rod when the latter is actuated to elevate the press head 5. It will be appreciated that the weight of the head and other structure associated therewith is considerable.

In operation, if it is desired to raise or lower the table member 12 relative to base 2, the upper supporting member 17 of the adjusting assembly is rigidly clamped to column 3 and crank 29 manipulated to rotate the adjusting rod 23 and elevate and vertically adjust the lower supporting member 18 in either direction, it being understood that the clamp 20 for this lower member is first loosened, likewise the table clamp 16. When the table is properly adjusted, these clamps or locks may be re-engaged. Should it be desired to alter the vertical position of the tool head relative to the base, the table member support 18 is clamped to the column and the head support 17, likewise head lock 111, loosened therefrom, whereby manipulation of crank 29 in either direction effects vertical adjustment of the head through the threaded screw connection to the fixedly positioned support 18. The sole precaution which need be taken in the adjustment of either of the members 17, 18 and the head or table associated therewith is that the other member must, of course, first be clamped to the column so as to serve as a thrust abutment or anchor for the assembly.

The foregoing assembly is readily adaptable for installation on all existing machine tools to thereby enlarge the range of work capable of being handled thereby. Table 12 may be dropped all the way down to the base, or, if desired, swung completely out of the way. Head 5 has a similarly wide adaptability for vertical positioning. These adjustments are quickly and easily effected by the relatively simple actuating structure described.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described my invention, what I claim as new and desire to secure by Letters Patent is:

1. In a machine tool or like construction having an elongated supporting column, a tool carrying head and a table, said head and table being mounted on said column for adjustment longitudinally thereof, supports for said head and table respectively in sustaining relation thereto and slidably engaged with said column, said supports having manually actuable means for selectively clamping the same to the column, an elongated adjusting screw rod disposed parallel to said column, said head support rotatably receiving and axially restraining said rod and said table support having threaded connection to the rod, and means associated with said head support and coacting with said rod for rotating the latter whereby a given support is adjustable longitudinally on said column by manipulation of said last named means upon the other support being secured to the column by its clamping means.

2. In a machine tool or like construction having an elongated supporting column, a tool carrying head and a table, said head and table being mounted on said column for adjustment longitudinally thereof, supports for said head and table respectively in sustaining relation thereto and slidably engaged with said column, said supports having manually actuable means for selectively clamping the same to the column, an elongated adjusting screw rod disposed parallel to said column, one of said supports rotatably receiving and axially restraining said rod and the other having threaded connection to the rod, and means associated with said one of said supports and coacting with said rod for rotating the latter whereby a given support is adjustable longitudinally on said column by manipulation of said last named means upon the other support being secured to the column by its clamping means.

3. In a machine tool construction of the class described, having an elongated column, tool head and work holder members slidably associated with said column in spaced relation to one another, said members having means coacting respectively therewith for selectively securing and supporting the same on the column in selected longitudinally adjusted positions thereon, an elongated actuating screw extending parallel to said column, said head member having means associated therewith for rotatably receiving and axially restraining said screw, the other member having means operatively associated therewith in actuating engagement with the screw, and a bevel gear secured to said screw and a further bevel gear coacting therewith for rotating the screw, whereby to adjust one of said members longitudinally of the column when the other is secured thereto and vice versa.

4. In a machine tool construction of the class described having an elongated column, tool head and work holder members slidably associated with said column in spaced relation to one another, said members having means coacting respectively therewith for selectively securing and supporting the same on the column in selected longitudinally adjusted positions thereon, an elongated actuating screw extending parallel to said column, one of said members having means associated therewith for rotatably receiving and axially restraining said screw, the other member having means operatively associated therewith in actuating engagement with the screw, and a bevel gear secured to said screw and a further bevel gear coacting therewith for rotating the screw, whereby to adjust one of said members longitudinally of the column when the other is secured thereto and vice versa.

5. In a machine tool construction of the class described having an elongated column, tool head and work holder members slidably associated with said column in spaced relation to one another, said members having means coacting respectively therewith for selectively securing and supporting the same on the column in selected longitudinally adjusted positions thereon, an elongated actuating element extending parallel to said column, one of said members having means associated therewith for axially restraining said element, the other member being in actuating engagement with the element, and means to actuate said element to adjust one of said members longitudinally of the column when the other is secured thereto and vice versa.

6. In a machine tool construction of the class described having an elongated column, a tool head and work holder, each longitudinally adjustable on said column, a supporting assembly for said head and holder comprising collar members slidably receivable on said column and sustainingly engageable with said head and holder respectively, said head and holder being angularly adjustable on said column relative to said collar members, means for securing said collar members on said column to prevent end movement thereon, and an elongated threaded actuating screw rotatably in and axially restrained by one of said collar members, said screw having a rotatably threaded actuating connection to the other member whereby rotation of said rod adjustably positions one of said collar members on the column when the other collar member is secured thereto and vice versa.

7. In a machine tool construction of the class described having an elongated column, a tool head and work holder, each longitudinally adjustable on said column, a supporting assembly for said head and holder comprising collar members slidably receivable on said column and sustainingly engageable with said head and holder respectively, said head and holder being angularly adjustable on said column relative to said collar members, means for securing said collar members on said column to prevent end movement thereon, and an actuating element extending parallel to said column and axially restrained by one of said collar members, said element having actuating connection to the other member to adjustably position one of said collar members on the column when the other collar member is secured thereto and vice versa.

8. In a machine tool construction of the class described having an elongated column, a tool head and work holder, each longitudinally adjustable on said column, a supporting assembly for said head and holder comprising collar members slidably receivable on said column and sustainingly engageable with said head and holder respectively, said head and holder being angularly adjustable on said column relative to said collar members, means for securing said collar members on said column to prevent end movement thereon, and means coacting with said collar members to selectively adjust either one thereof longitudinally of the column when the other is secured thereto.

9. An adjusting assembly for machine tools provided with a supporting column and a tool head and work holder adjustable longitudinally of said column, said assembly comprising collar members adapted to be operatively and sustainingly associated with said head and holder respectively and each having column receiving and clamping means for selectively adjusting and securing the same in different positions longitudinally of the column, and an adjusting screw disposed parallel to said column, said screw being rotatable in and axially restrained by one of said collar members, and coacting bevel gears respectively secured to said screw and rotatable in said one of said members for rotating the screw, the other of said members having threaded actuating engagement with said screw for selective longitudinal adjustment of either of said members relative to the column when the other is clamped thereto.

10. An adjusting assembly for machine tools provided with a supporting column and a tool head and work holder adjustable longitudinally of said column, said assembly comprising collar members adapted to be operatively and sustainingly associated with said head and holder respectively and each having column receiving and clamping means for selectively adjusting and securing the same in different positions longitudinally of the column, and an actuating element disposed parallel to said column axially restrained by one of said collar members, the other of said members having actuating engagement with said element for selective longitudinal adjustment of either of said members relative to the column when the other is clamped thereto.

11. In a construction of the class described, an elongated vertical column, a tool head and a table slidably associated with said column in spaced relation to one another, supports for said head and table mounted on the column for vertical sliding adjustment and sustainingly engageable with the head and table respectively, said supports having clamping means for selectively securing the same in adjusted position longitudinally of the column, an elongated actuating member extending parallel to said column and engageable with said supports, said member being connected in longitudinally restrained relation to one of the supports and having an operating connection to the other support for vertically adjusting the same longitudinally of the column and relative to the actuating member, and means coacting with said actuating member for vertically adjusting one of said supports on the column when the other is clamped thereto and vice versa, said actuating member in one case traveling vertically with the support to which it is restrainedly connected and in the other case being fixed therewith relative to the column for the vertical travel, on said actuating member, of the support being adjusted.

12. In a construction of the class described, an elongated vertical column, a tool head and a table slidably associated with said column in spaced relation to one another, supports for said head and table mounted on the column for sliding adjustment and sustainingly engageable with the head and table respectively, means for selectively securing the supports in adjusted position longitudinally of the column, an elongated actuating member extending parallel to said column and engageable with said supports, said member being connected in longitudinally restrained relation to one of the supports and having an operating connection to the other support for adjusting the same longitudinally of the column, and means coacting with said actuating member for vertically adjusting one of said supports on the column when the other is clamped thereto and vice versa, said actuating member in one case traveling with the support to which it is restrainedly connected and in the other case being fixed therewith relative to the column for the travel of the support being adjusted.

HENRY E. MUSSELMAN.